United States Patent
Lin et al.

(10) Patent No.: US 10,175,098 B2
(45) Date of Patent: Jan. 8, 2019

(54) OPTICAL SENSING CIRCUIT HAVING PLURAL SENSING COMPONENTS WITH CURRENT PATHS SELECTIVELY ESTABLISHED ACCORDING TO RECEIVED COLORED LIGHT AND DISPLAY PANEL UTILIZING THE SAME

(71) Applicant: AU Optronics Corporation, Hsin-chu (TW)

(72) Inventors: Chih-Lung Lin, Hsin-chu (TW); Chia-En Wu, Hsin-chu (TW); Po-Syun Chen, Hsin-chu (TW); Fu-Hsing Chen, Hsin-chu (TW); Ming-Xun Wang, Hsin-chu (TW); Ching-En Lee, Hsin-chu (TW); Po-Cheng Lai, Hsin-chu (TW); Jian-Shen Yu, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 87 days.

(21) Appl. No.: 15/450,583

(22) Filed: Mar. 6, 2017

(65) Prior Publication Data

US 2017/0276541 A1 Sep. 28, 2017

(30) Foreign Application Priority Data

Mar. 23, 2016 (TW) .............................. 105109004 A

(51) Int. Cl.
*G01J 1/02* (2006.01)
*G01J 1/04* (2006.01)
(Continued)

(52) U.S. Cl.
CPC .......... *G01J 1/0214* (2013.01); *G01J 1/0488* (2013.01); *G01J 1/46* (2013.01); *G06F 3/042* (2013.01);
(Continued)

(58) Field of Classification Search
CPC .......... G01J 1/0214; G01J 1/0488; G01J 1/46; G01J 2001/4473
(Continued)

(56) References Cited

U.S. PATENT DOCUMENTS 7,205,830 B2   4/2007  Gangasani et al.
8,325,155 B2   12/2012 Chang et al.
(Continued)

FOREIGN PATENT DOCUMENTS

CN   101064787 A   10/2007
CN   103903522 A   7/2014
(Continued)

OTHER PUBLICATIONS

Office Action issued by the State Intellectual Property Office of the Peoples Republic of China dated May 27, 2017 for CN 201610321193.X.

*Primary Examiner* — Que T Le
(74) *Attorney, Agent, or Firm* — Tim Tingkang Xia, Esq.; Locke Lord LLP

(57) ABSTRACT

An optical sensing circuit has a plurality of optical sensing units arranged so that the optical sensing circuit is ambient light insensitive or sensitive to light within certain spectrum. The sensitive spectra corresponding to the plurality of optical sensing units are different from one another.

18 Claims, 14 Drawing Sheets

(51) Int. Cl.
*G01J 1/46* (2006.01)
*G06F 3/042* (2006.01)
*G01J 1/44* (2006.01)
*G06F 3/03* (2006.01)

(52) U.S. Cl.
CPC ..... *G01J 2001/4473* (2013.01); *G06F 3/0304* (2013.01)

(58) Field of Classification Search
USPC ..................................................... 250/214 R
See application file for complete search history.

(56) References Cited

U.S. PATENT DOCUMENTS

| | | | |
|---|---|---|---|
| 8,564,579 B2 * | 10/2013 | Kwon | G01J 1/32 345/102 |
| 8,686,479 B2 | 4/2014 | Hynecek | |
| 2009/0141202 A1 | 6/2009 | Yoshida | |
| 2013/0127792 A1 | 5/2013 | Chang et al. | |
| 2016/0020337 A1 | 1/2016 | Yu et al. | |

FOREIGN PATENT DOCUMENTS

| | | |
|---|---|---|
| CN | 104182098 A | 12/2014 |
| TW | 201243814 A | 11/2012 |

\* cited by examiner

OPTICAL SENSING CIRCUIT HAVING PLURAL SENSING COMPONENTS WITH CURRENT PATHS SELECTIVELY ESTABLISHED ACCORDING TO RECEIVED COLORED LIGHT AND DISPLAY PANEL UTILIZING THE SAME

CROSS-REFERENCE TO RELATED PATENT APPLICATION

This application claims the benefit of priority to Taiwan Patent Application No. 105109004, filed Mar. 23, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to relates to an optical sensing circuit and a display panel using the optical sensing circuit, and in particular, to an optical sensing circuit having a particular sensing frequency range and a display panel having the optical sensing circuit.

BACKGROUND

An optical sensing circuit may be applied in an optical-touch apparatus, to implement optical-touch control (non-touch control). An existing optical sensing circuit can implement a feature of being sensitive to particular light (for example, red light). However, because red light is also a component of white light, when exposed to ambient light, an optical sensing circuit sensitive to red light sends a touch indication signal, causing an erroneous touch control event to occur.

In view of this, it is an objective in the art to provide an organic light-emitting display device to reduce the border width of the organic light-emitting display device.

SUMMARY

The present disclosure provides an optical sensing circuit and a display panel using the optical sensing circuit, to eliminate interference from ambient light or sense light of a particular color except three primary colors.

According to an embodiment of the present disclosure, an optical sensing circuit having a first sensing component, a capacitor, a sampling circuit, a first ambient light sensing circuit, and a second ambient light sensing circuit is provided. The first sensing component has a first end and a second end, where a first current path between the first end of the first sensing component and the second end of the first sensing component is selectively established according to whether the first sensing component receives first colored light. The capacitor is separately electrically connected to the first end of the first sensing component and a first voltage end. The sampling circuit is electrically connected to the first end of the first sensing component. The first ambient light sensing circuit has a second sensing component and a third sensing component. The second sensing component has a first end and a second end, where the first end of the second sensing component is electrically connected to the second end of the first sensing component, and a second current path between the first end of the second sensing component and the second end of the second sensing component is selectively established according to whether the second sensing component receives the first colored light. The third sensing component has a first end and a second end, where the first end of the third sensing component is electrically connected to the second end of the first sensing component, the second end of the third sensing component is electrically connected to a voltage source, and a third current path between the first end of the third sensing component and the second end of the third sensing component is selectively established according to whether the third sensing component receives second colored light. The second ambient light sensing circuit is separately electrically connected to the second end of the second sensing component, a first signal end, and a voltage source, and is configured to electrically connect, in a sensing time interval, the first signal end to the second end of the second sensing component when the first colored light is sensed, and electrically connect the voltage source to the second end of the second sensing component when the second colored light is sensed. In the sensing time interval, a voltage of the first signal end is different from a voltage of the voltage source.

According to an embodiment of the present disclosure, an optical sensing circuit having a first sensing component, a capacitor, a sampling circuit, a second sensing component, and a third sensing component is provided. The first sensing component has a first end and a second end, where a first current path between the first end of the first sensing component and the second end of the first sensing component is selectively established according to whether the first sensing component receives first colored light. The capacitor is separately electrically connected to the first end of the first sensing component and a first voltage end. The sampling circuit is electrically connected to the first end of the first sensing component. The second sensing component has a first end and a second end, where the first end of the second sensing component is electrically connected to the second end of the first sensing component, the second end of the second sensing component is electrically connected to a first signal end, and a second current path between the first end of the second sensing component and the second end of the second sensing component is selectively established according to whether the second sensing component receives second colored light. The third sensing component has a first end and a second end, where the first end of the third sensing component is electrically connected to the second end of the first sensing component, the second end of the third sensing component is electrically connected to a voltage source, and a third current path between the first end of the third sensing component and the second end of the third sensing component is selectively established according to whether the third sensing component receives third colored light.

According to an embodiment of the present disclosure, an optical sensing circuit having a first color filtering component, a second color filtering component, a first photosensitive transistor switch, a capacitor, a sampling circuit, a second photosensitive transistor switch, a third photosensitive transistor switch, a fourth photosensitive transistor switch, and a fifth photosensitive transistor switch is provided. The first color filtering component blocks light except first colored light. The second color filtering component blocks light except second colored light. The first colored light and the second colored light are different from each other. The first photosensitive transistor switch is arranged opposite to the first color filtering component, and has a first end and a second end. The capacitor is separately electrically connected to the first end of the first photosensitive transistor switch and a first voltage end. The sampling circuit is electrically connected to the first end of the first photosensitive transistor switch. The second photosensitive transistor switch is arranged opposite to the first color filtering component, and has a control end, a first end, and a second end, where the first end of the second photosensitive transistor switch is electrically connected to the second end of the first photosensitive transistor switch, and the control end of the second photosensitive transistor switch is electrically connected to the second end of the second photosensitive transistor switch. The third photosensitive transistor switch is arranged opposite to the second color filtering component, and has a control end, a first end, and a second end, where both of the first end of the third photosensitive transistor switch and the control end of the third photosensitive transistor switch are electrically connected to the second end of the first photosensitive transistor switch, and the second end of the third photosensitive transistor switch is electrically connected to a voltage source. The fourth photosensitive transistor switch is arranged opposite to the first color filtering component, and has a control end, a first end, and a second end, where the first end of the fourth photosensitive transistor switch is electrically connected to the second end of the second photosensitive transistor switch, and both of the control end of the fourth photosensitive transistor switch and the second end of the fourth photosensitive transistor switch are electrically connected to a first signal end. The fifth photosensitive transistor switch is arranged opposite to the second color filtering component, and has a control end, a first end, and a second end, where both of the first end of the fifth photosensitive transistor switch and the control end of the fifth photosensitive transistor switch are electrically connected to the second end of the second photosensitive transistor switch, and the second end of the fifth photosensitive transistor switch is electrically connected to a voltage source.

According to an embodiment of the present disclosure, an optical sensing circuit having a first color filtering component, a second color filtering component, a third color filtering component, a first photosensitive transistor switch, a capacitor, a sampling circuit, a second photosensitive transistor switch, and a third photosensitive transistor switch is provided. The first color filtering component blocks light except first colored light. The second color filtering component blocks light except second colored light. The third color filtering component blocks light except third colored light. The first colored light, the second colored light, and the third colored light are different from each other. The first photosensitive transistor switch is arranged opposite to the first color filtering component, and has a first end and a second end. The capacitor is separately electrically connected to the first end of the first photosensitive transistor switch and a first voltage end. The sampling circuit is electrically connected to the first end of the first photosensitive transistor switch. The second photosensitive transistor switch is arranged opposite to the second color filtering component, and has a control end, a first end, and a second end, where the first end of the second photosensitive transistor switch is electrically connected to the second end of the first photosensitive transistor switch, and both of the second end of the second photosensitive transistor switch and the control end of the second photosensitive transistor switch are electrically connected to a first signal end. The third photosensitive transistor switch has a control end, a first end, and a second end, where both of the first end of the third photosensitive transistor switch and the control end of the third photosensitive transistor switch are electrically connected to the second end of the first photosensitive transistor switch, and the second end of the third photosensitive transistor switch is electrically connected to a voltage source.

According to an embodiment of the present disclosure, a display panel is provided. A substrate of the display panel has a plurality of pixel units, where each pixel unit includes at least three sub-pixels. One of the foregoing optical sensing circuits is configured in at least one of the sub-pixels.

The foregoing descriptions about the content of the present disclosure and the following descriptions of embodiments are intended to illustrate and explain the spirit and principle of the present disclosure and provide a further explanation of the patent application scope of the present disclosure.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Specific features and advantages of the present disclosure are described in detail in the following embodiments. Content thereof is sufficient for any person skilled in the art to understand and implement the technical content of the present disclosure, and any person skilled in the art can easily understand a related objective and the advantages of the present disclosure according to the content, claims, and drawings that are disclosed in this specification. The following embodiments are intended to further describe the ideas of the present disclosure in detail, and are not intended to limit the scope of the present disclosure to any of the ideas.

Figure 1:
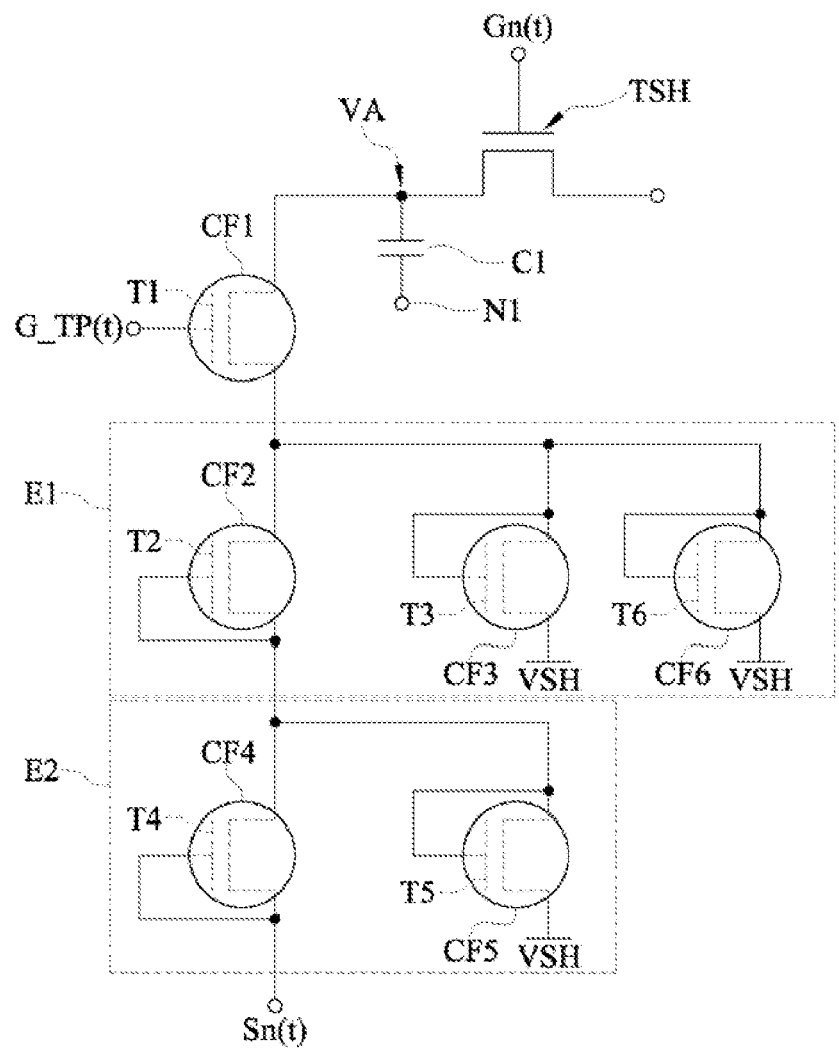
FIG. 1 is a schematic diagram of an optical sensing circuit according to an embodiment of the present disclosure.

Refer to FIG. 1, which is a schematic diagram of an optical sensing circuit according to an embodiment of the present disclosure. As shown in FIG. 1, an optical sensing circuit 1000 according to an embodiment of the present disclosure has first color filtering components CF1, CF2, and CF4, second color filtering components CF3 and CF5, a first photosensitive transistor switch T1, a capacitor C1, a sampling circuit TSH, a second photosensitive transistor switch T2, a third photosensitive transistor switch T3, a fourth photosensitive transistor switch T4, and a fifth photosensitive transistor switch T5. The first color filtering components CF1, CF2, and CF4 can block light except first colored light. The second color filtering components CF3 and CF5 block light except second colored light, where the first colored light and the second colored light are different from each other. In this embodiment, the first colored light is, for example, about red light, and the second colored light is, for example, about blue light. In an embodiment, the first color filtering components are separate entities, while in another embodiment, the first color filtering components CF1, CF2, and CF4 are actually parts of a red color filter, and similarly, the second color filtering components CF3 and CF5 are parts of a blue color filter.

The first photosensitive transistor switch T1 is arranged opposite to the first color filtering component CF1, and has a first end and a second end. Using FIG. 1 as an example, the first end is an upper end and the second end is a lower end. Besides, the first photosensitive transistor switch T1 also has a control end (gate). Specifically, using an example in which the first photosensitive transistor switch T1 is an N-type thin-film transistor, when a voltage G_TP(t) of the control end of the first photosensitive transistor switch T1 is a high voltage VGH, the first photosensitive transistor switch T1 is turned on, so that charges can flow between the first end and the second end. When the gate voltage of the first photosensitive transistor switch T1 is a low voltage VGL, if the first photosensitive transistor switch T1 is not exposed to light, the first photosensitive transistor switch T1 is not turned on. Conversely, if the first photosensitive transistor switch T1 is exposed to light, the first photosensitive transistor switch T1 is turned on. In this embodiment, because the first photosensitive transistor switch T1 is arranged opposite to the first color filtering component CF1 and the first color filtering component CF1 is a red color filter, if light falling on the first color filtering component CF1 does not include red light, no light can penetrate through the first color filtering component CF1 to trigger the turning on of the first photosensitive transistor switch T1. Only when light falling on the first color filtering component CF1 includes red light, can red light penetrate through the first color filtering component CF1 to trigger the turning on of the first photosensitive transistor switch T1.

The capacitor C1 is separately electrically connected to the first end of the first photosensitive transistor switch T1 and a first voltage end N1. The first voltage end N1 may be at a ground potential (GND) or a pixel-sharing potential (VCOM). Therefore, a sensing voltage VA of the first end of the first photosensitive transistor switch T1 can be stored in the capacitor C1 in forms of charges.

The sampling circuit TSH is electrically connected to the first end of the first photosensitive transistor switch T1. The sampling circuit TSH is configured to read the sensing voltage VA in a sampling time interval. Although a switch is used to implement the sampling circuit in this embodiment, many common means in the field of signal processing can also be used as the sampling circuit, such as a sense amplifier for memory reading, a pre-amplification circuit (pre-amplifier) in an analog-to-digital conversion circuit, or another circuit suitable for continuous or discrete sampling of the sensing voltage VA, which are not limited in the present disclosure. It should be noted that, using the transistor switch T1 of the sampling circuit TSH in FIG. 1 as an example, the sampling circuit TSH only has an on/off or switching capability, and does not have a capability of sensing colored light, and another type of sampling circuit is selected still according to this manner.

The second photosensitive transistor switch T2 is arranged opposite to the first color filtering component CF2, and has a control end (gate), a first end (an upper end), and a second end (a lower end), where the first end of the second photosensitive transistor switch T2 is electrically connected to the second end of the first photosensitive transistor switch T1, and the control end of the second photosensitive transistor switch T2 is electrically connected to the second end of the second photosensitive transistor switch T2.

The third photosensitive transistor switch T3 is arranged opposite to the second color filtering component CF3, and has a control end (gate), a first end (an upper end), and a second end (a lower end), where both of the first end of the third photosensitive transistor switch T3 and the control end of the third photosensitive transistor switch T3 are electrically connected to the second end of the first photosensitive transistor switch T1, and the second end of the third photosensitive transistor switch T3 is electrically connected to a voltage source VSH. The second photosensitive transistor switch T2 and the third photosensitive transistor switch T3 form a first ambient light sensing circuit E1 in an embodiment of the present disclosure.

The fourth photosensitive transistor switch T4 is arranged opposite to the first color filtering component CF4, and has a control end (gate), a first end (an upper end), and a second end (a lower end), where the first end of the fourth photosensitive transistor switch T4 is electrically connected to the second end of the second photosensitive transistor switch T2, and both of the control end of the fourth photosensitive transistor switch T4 and the second end of the fourth photosensitive transistor switch T4 are electrically connected to a first signal end Sn(t).

The fifth photosensitive transistor switch T5 is arranged opposite to the second color filtering component CF5, and has a control end (gate), a first end (an upper end), and a second end (a lower end), where both of the first end of the fifth photosensitive transistor switch T5 and the control end of the fifth photosensitive transistor switch T5 are electrically connected to the second end of the second photosensitive transistor switch T2, and the second end of the fifth photosensitive transistor switch T5 is electrically connected to a voltage source VSH. The fourth photosensitive transistor switch T4 and the fifth photosensitive transistor switch T5 form a second ambient light sensing circuit E2 in an embodiment of the present disclosure.

Figure 2A:
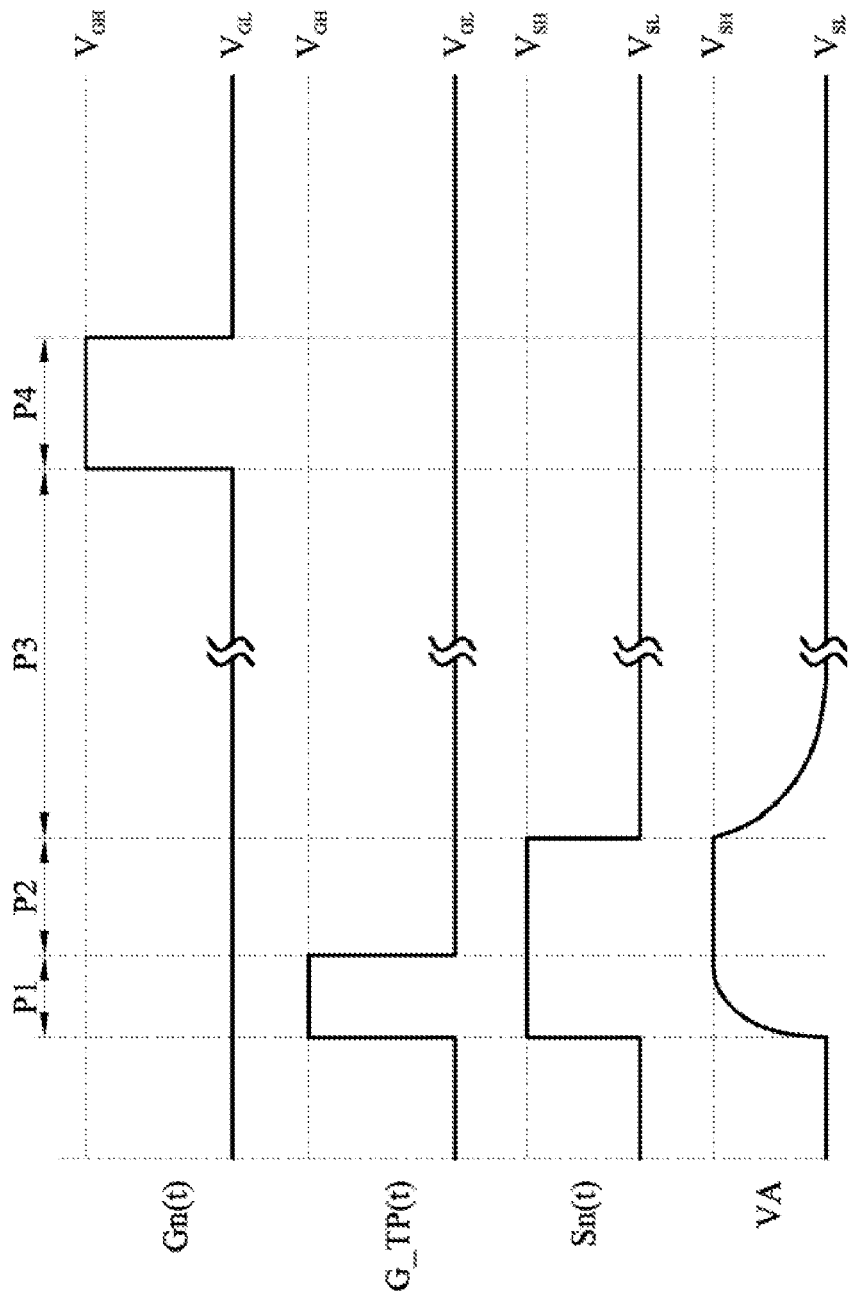
FIG. 2A and FIG. 2B are signal sequence diagrams related to FIG. 1.
Figure 2B:
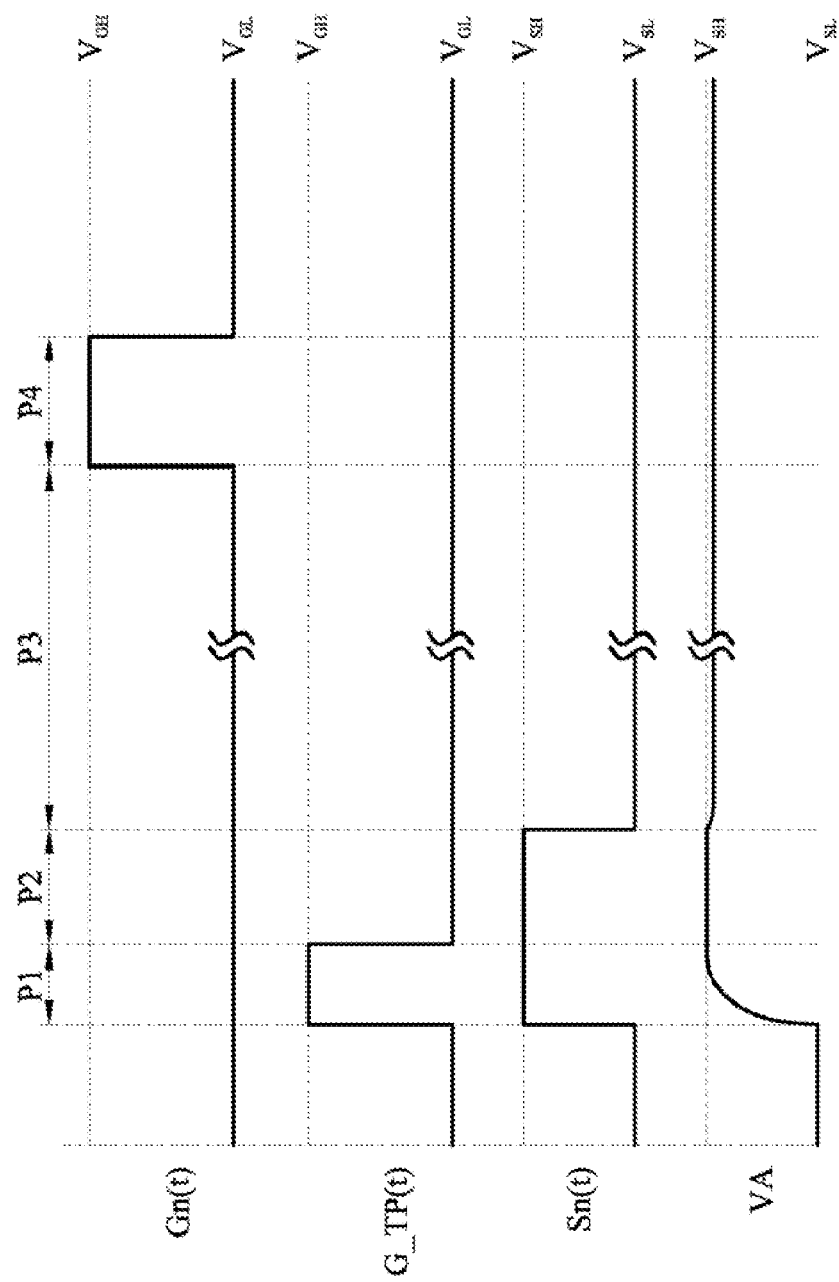

Refer to FIG. 2A and FIG. 2B, which are signal sequence diagrams related to FIG. 1. It should be noted that, in this embodiment, a voltage source VSH is at about a high voltage VSH. In FIG. 2A, the color filtering components are exposed to red light. In FIG. 2B, the color filtering components are exposed to white light. As shown in FIG. 2A, in a pre-charging time interval P1, the gate voltage G_TP(t) of the first photosensitive transistor switch T1 is about a high voltage VGH, and the first signal end Sn(t) is at about the high voltage VSH; therefore, the first photosensitive transistor switch T1, the second photosensitive transistor switch T2, and the fourth photosensitive transistor switch T4 are all turned on. Therefore, the sensing voltage VA will increase to near the high voltage VSH. Then, in a switching time interval P2, the gate voltage G_TP(t) of the first photosensitive transistor switch T1 switches to about a low voltage VGL, to alleviate transistor aging caused when the gate voltage of the first photosensitive transistor switch T1 remains at about the high voltage VSH for a long time, but the first signal end Sn(t) still remains at about the high voltage VSH. In a sensing time interval P3, the first signal end Sn(t) switches to about a low voltage VSL. Because the first color filtering components CF1, CF2, and CF4 and the second color filtering components CF3 and CF5 are all exposed to red light, the first photosensitive transistor switch T1, the second photosensitive transistor switch T2, and the fourth photosensitive transistor switch T4 are turned on under the effect of light. In the sensing time interval P3, because of the connection manners of the third photosensitive transistor switch T3 and the fifth photosensitive transistor switch T5, and because neither of the two photosensitive transistor switches is triggered by light, the two photosensitive transistor switches are not turned on. Therefore, the sensing voltage VA will decrease to the voltage of the first signal end Sn(t), that is, about the low voltage VSL. In a sampling time interval P4, a control signal Gn(t) of the sampling circuit switches from about the low voltage VGL to about the high voltage VGH, so as to perform sampling on the sensing voltage VA, to obtain the low voltage VSL, and therefore, it is determined that the optical sensing circuit is exposed to red light.

In an example in FIG. 2B, in a sensing time interval P3, because the color filtering components are exposed to white light, red light penetrates through the first color filtering components CF1, CF2, and CF4, and blue light penetrates through the second color filtering components CF3 and CF5. Therefore, all the photosensitive transistor switches are turned on under the effect of light. Therefore, a voltage value of the sensing voltage VA will not decrease to the low voltage VSL. In some embodiments, through proper design, channel widths of the third photosensitive transistor switch T3 and the fifth sensing transistor switch T5 are greater than those of the second photosensitive transistor switch T2 and the fourth photosensitive transistor switch T4, and therefore, the voltage value of the sensing voltage VA will be even close to the voltage (the high voltage VSH) of the voltage source VSH. Although the second color filtering components CF3 and CF5 in the forgoing embodiment are blue color filters, actually, the second color filtering components may also be green color filters or filters of other colors (except red).

In terms of action mechanism, using the second photosensitive transistor switch T2 as an example, in the sensing time interval P3, a current I2 that flows through the second photosensitive transistor switch T2 to the first photosensitive transistor switch T1 is about proportional to a product of a luminous flux LR of red light and the channel width of the second photosensitive transistor switch T2. Using the third photosensitive transistor switch T3 as an example, in the sensing time interval P3, a current I3 that flows through the third photosensitive transistor switch T3 to the first photosensitive transistor switch T1 is about proportional to a product of a luminous flux LB of blue light and the channel width of the third photosensitive transistor switch T3. The same is true for the fourth photosensitive transistor switch T4 and the fifth photosensitive transistor switch T5. Therefore, through proper design, the sensing voltage VA will decrease to the low voltage VSL in the sensing time interval P3 only when a ratio of the luminous flux of red light to the luminous flux of blue light is greater than a threshold. The threshold is, for example, 2. However, a person with common knowledge in the field can freely design a value of the threshold, and the threshold is not limited to 2 in the present disclosure. Therefore, in an environment in which ambient light also exists, when the optical sensing circuit 1000 is exposed to only ambient light, although the second photosensitive transistor switch T2 and the third photosensitive transistor switch T3 are turned on simultaneously, a current that flows through the second photosensitive transistor switch T2 (and the fourth photosensitive transistor switch T4) to the first signal end Sn(t) is soon compensated by a current that is provided by the voltage source and that flows through the third photosensitive transistor T3, so that the voltage in the sensing voltage VA does not decrease obviously.

In other words, in the foregoing embodiment, both of the first ambient light sensing circuit E1 and the second ambient light sensing circuit E2 have two input ends (lower ends) and one output end (an upper end). In any one of the ambient light sensing circuits, one input end is selectively electrically connected to the output end according to whether red light is sensed, and the other input end is selectively electrically connected to the output end according to whether blue light is sensed. In addition, through particular design of a time sequence of the voltages of the voltage source VSH and the first signal end Sn(t), a voltage value of the sensing voltage VA corresponding to red light (monochromatic light) is different from a voltage value corresponding to white light or polychromatic light.

Through the foregoing design, an optical sensing circuit insensitive to ambient light is implemented. Besides, the second photosensitive transistor switch T2 degrades only when the fourth photosensitive transistor switch T4 has already degraded and remains in a turned-on state permanently. Therefore, a service life and reliability of the optical sensing circuit implemented according to this embodiment are ensured.

In an embodiment, also referring to FIG. 1, the first ambient light sensing circuit E1 further has a sixth photosensitive transistor switch T6, and the sixth photosensitive transistor switch T6 is arranged opposite to a third color filtering component CF6. In this embodiment, when the first color filtering components are all red color filters and the second color filtering components are all blue color filters, the third color filtering component CF6 is a green color filter.

Figure 3:
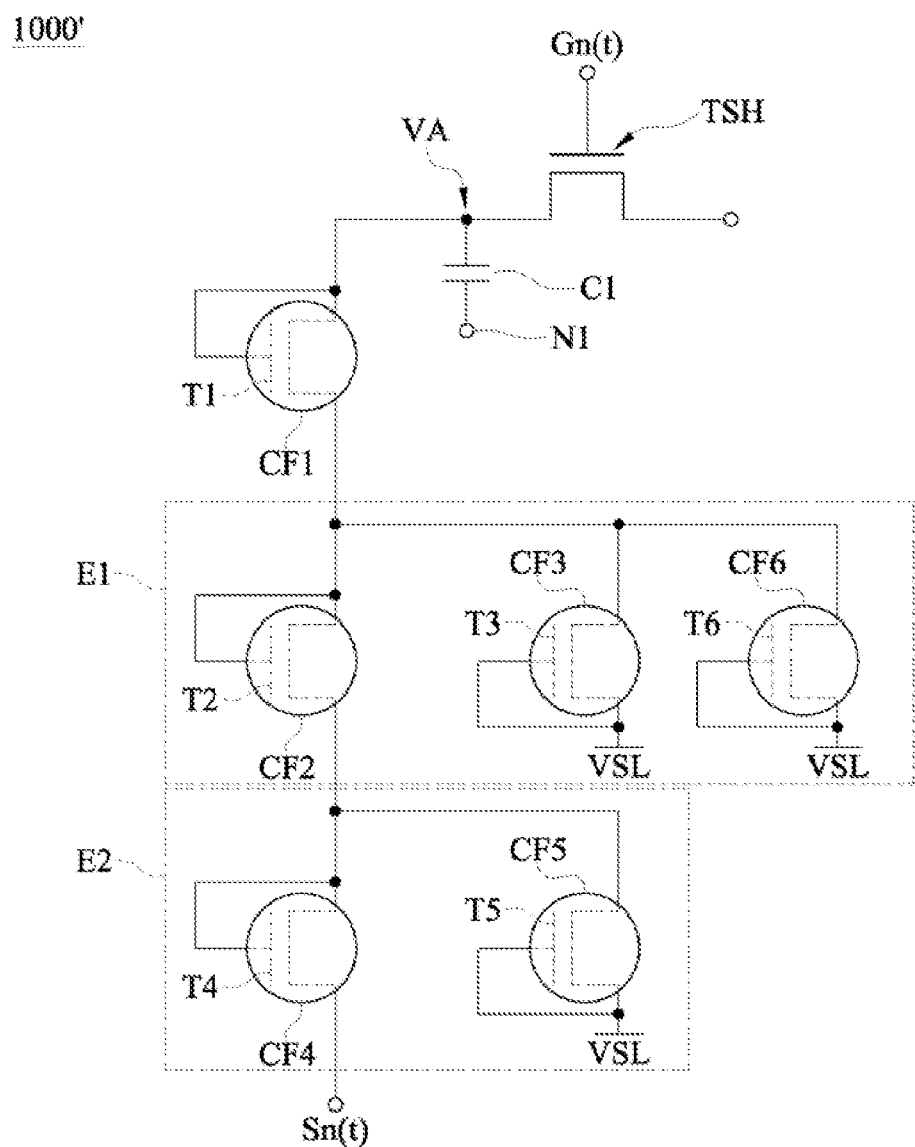
FIG. 3 is a schematic diagram of an optical sensing circuit according to another embodiment of the present disclosure.

In another embodiment of the present disclosure, refer to FIG. 3, which is a schematic diagram of an optical sensing circuit according to another embodiment of the present disclosure. As shown in FIG. 3, a difference between an optical sensing circuit 1000' and the optical sensing circuit 1000 in FIG. 1 lies in: a control end of a first photosensitive transistor switch T1 is electrically connected to a first end of the first photosensitive transistor switch T1, a control end of a second photosensitive transistor switch T2 is electrically connected to a first end of the second photosensitive transistor switch T2, a control end of a third photosensitive transistor switch T3 is electrically connected to a second end of the third photosensitive transistor switch T3, a control end of a fourth photosensitive transistor switch T4 is electrically connected to a first end of the fourth photosensitive transistor switch T4, and a control end of a fifth photosensitive transistor switch T5 is electrically connected to a second end of the fifth photosensitive transistor switch T5. Besides, a voltage source is a VSL, and a voltage of the voltage source is about a low voltage VSL. The foregoing optical sensing circuit 1000 in FIG. 1 may be referred to as a discharging mode optical sensing circuit, while the optical sensing circuit 1000' in FIG. 3 may be referred to as a charging mode optical sensing circuit. In an embodiment, a control end of a sixth photosensitive transistor switch T6 is electrically connected to a second end of the sixth photosensitive transistor switch T6.

Figure 4:
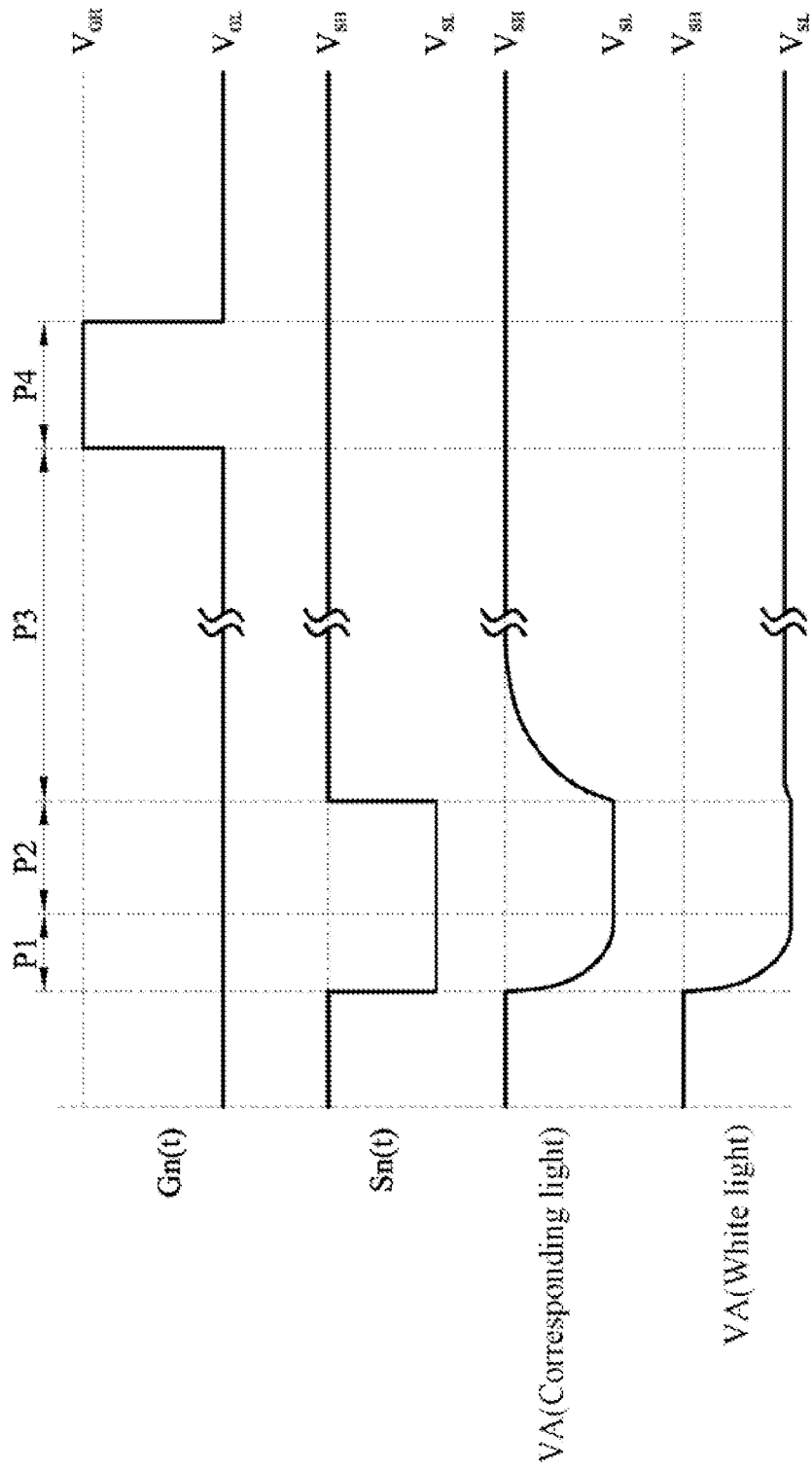
FIG. 4 is a signal sequence diagram corresponding to FIG. 3.

Refer to FIG. 4, which is a signal sequence diagram corresponding to FIG. 3. As shown in FIG. 4, in a precharging time interval P1 and a switching time interval P2, a voltage of a first signal end Sn(t) is a low voltage VSL; therefore, the first photosensitive transistor switch T1, the second photosensitive transistor switch T2, and the fourth photosensitive transistor switch T4 are all in a turned-on state because the switches are all diode-connected. Therefore, in the foregoing time intervals, the sensing voltage VA decreases to the low voltage VSL. Then, in a sensing time interval P3, the voltage of the first signal end Sn(t) switches to a high voltage VSH. In this case, if the color filtering components of the optical sensing circuit 1000' are exposed to only red light, the first photosensitive transistor switch T1, the second photosensitive transistor switch T2, and the fourth photosensitive transistor switch T4 are turned on under the effect of light, while the third photosensitive transistor switch T3, the fifth photosensitive transistor switch T5, and the sixth photosensitive transistor switch T6 are not triggered and are therefore not turned on. Therefore, the sensing voltage VA will decrease to near the high voltage VSH, as shown in a signal sequence diagram of VA (corresponding light) in the figure.

Conversely, if the voltage of the first signal end Sn(t) switches to the high voltage VSH in the sensing time interval P3, if the color filtering components of the optical sensing circuit 1000' are exposed to white light, the first photosensitive transistor switch T1, the second photosensitive transistor switch T2, and the fourth photosensitive transistor switch T4 are turned on under the effect of light, while the third photosensitive transistor switch T3 and the fifth photosensitive transistor switch T5 are turned on under the effect of blue light, and the sixth photosensitive transistor switch T6 is turned on under the effect of green light. Therefore, the sensing voltage VA will not increase to near the high voltage VSH, but instead remains close to the low voltage VSL, as shown in a signal sequence diagram of VA (white light) in the figure.

In the foregoing embodiment, the photosensitive transistor switches are used as parts of the sensing components, but it can be known that the diode-connected photosensitive transistor switches can be replaced by photo diodes (PD). A person with common knowledge in the field should know how to configure a photo diode to replace a photosensitive transistor switch, which is not described in detail in the present disclosure.

Figure 5:
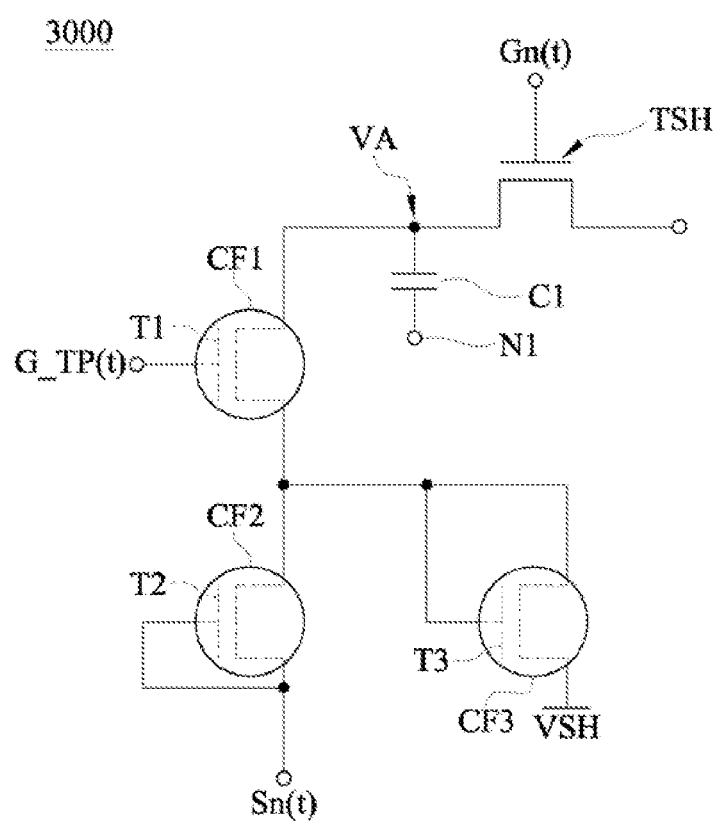
FIG. 5 is a schematic diagram of an optical sensing circuit according to another embodiment of the present disclosure.

For an optical sensing circuit according to another embodiment of the present disclosure, refer to FIG. 5, which is a schematic diagram of an optical sensing circuit according to another embodiment of the present disclosure. As shown in FIG. 5, an optical sensing circuit 3000 according to an embodiment of the present disclosure has a color filtering component CF1, a color filtering component CF2, a color filtering component CF3, a first photosensitive transistor switch T1, a capacitor C1, a sampling circuit TSH, a second photosensitive transistor switch T2, and a third photosensitive transistor switch T3. The color filtering component CF1 blocks light except first colored light. The color filtering component CF2 blocks light except second colored light. The color filtering component CF3 blocks light except third colored light. The first colored light, the second colored light, and the third colored light are different from each other. In the following embodiment, an example in which the first colored light is about red light, the second colored light is about blue light, and the third colored light is about green light is used for description.

The first photosensitive transistor switch T1 is arranged opposite to the color filtering component CF1, and has a first end and a second end. Using FIG. 5 as an example, the first end is an upper end and the second end is a lower end. Besides, the first photosensitive transistor switch T1 also has a control end (gate). Specifically, using an example in which the first photosensitive transistor switch T1 is an N-type thin-film transistor, when a voltage G_TP(t) of the control end of the first photosensitive transistor switch T1 is about a high voltage VGH, the first photosensitive transistor switch T1 is turned on, so that charges can flow between the first end and the second end. When the gate voltage of the first photosensitive transistor switch T1 is about a low voltage VGL, if the first photosensitive transistor switch T1 is not exposed to light, the first photosensitive transistor switch T1 is not turned on. Conversely, if the first photosensitive transistor switch T1 is exposed to light, the first photosensitive transistor switch T1 is turned on. In this embodiment, because the first photosensitive transistor switch T1 is arranged opposite to the color filtering component CF1 and the color filtering component CF1 is a red color filter, if light falling on the color filtering component CF1 does not include red light, no light can penetrate through the color filtering component CF1 to trigger the turning on of the first photosensitive transistor switch T1. Only when light falling on the color filtering component CF1 includes red light, can the red light penetrate through the color filtering component CF1 to trigger the turning on of the first photosensitive transistor switch T1. In other words, the first photosensitive transistor switch T1 and the color filtering component CF1 form a first sensing component.

The capacitor C1 is separately electrically connected to the first end of the first photosensitive transistor switch T1 and a first voltage end N1. Therefore, a sensing voltage VA of the first end of the first photosensitive transistor switch T1 can be stored in the capacitor C1 in forms of charges.

The sampling circuit TSH is electrically connected to the first end of the first photosensitive transistor switch T1. The sampling circuit TSH is configured to read the sensing voltage VA in a sampling time interval. Although a switch is used to implement the sampling circuit in this embodiment, many common means in the field of signal processing can also be used as the sampling circuit, such as a sense amplifier for memory reading, a pre-amplification circuit (pre-amplifier) in an analog-to-digital conversion circuit, or another circuit suitable for continuous or discrete sampling of the sensing voltage VA, which are not limited in the present disclosure. It should be noted that, using the transistor switch T1 of the sampling circuit TSH in FIG. 1 as an example, the sampling circuit TSH only has an on/off or switching capability, and does not have a capability of sensing colored light, and another type of sampling circuit is selected still according to this manner.

The second photosensitive transistor switch T2 is arranged opposite to the color filtering component CF2, and has a control end (gate), a first end (an upper end), and a second end (a lower end), where the first end of the second photosensitive transistor switch T2 is electrically connected to the second end of the first photosensitive transistor switch T1, the control end of the second photosensitive transistor switch T2 is electrically connected to the second end of the second photosensitive transistor switch T2, and the second end of the second photosensitive transistor switch T2 is electrically connected to a first signal end Sn(t). The second photosensitive transistor switch T2 and the color filtering component CF2 form a second sensing component.

The third photosensitive transistor switch T3 is arranged opposite to the color filtering component CF3, and has a control end (gate), a first end (an upper end), and a second end (a lower end), where both of the first end of the third photosensitive transistor switch T3 and the control end of the third photosensitive transistor switch T3 are electrically connected to the second end of the first photosensitive transistor switch T1, and the second end of the third photosensitive transistor switch T3 is electrically connected to a voltage source VSH. The third photosensitive transistor switch T3 and the color filtering component CF3 form a third sensing component.

Figure 6A:
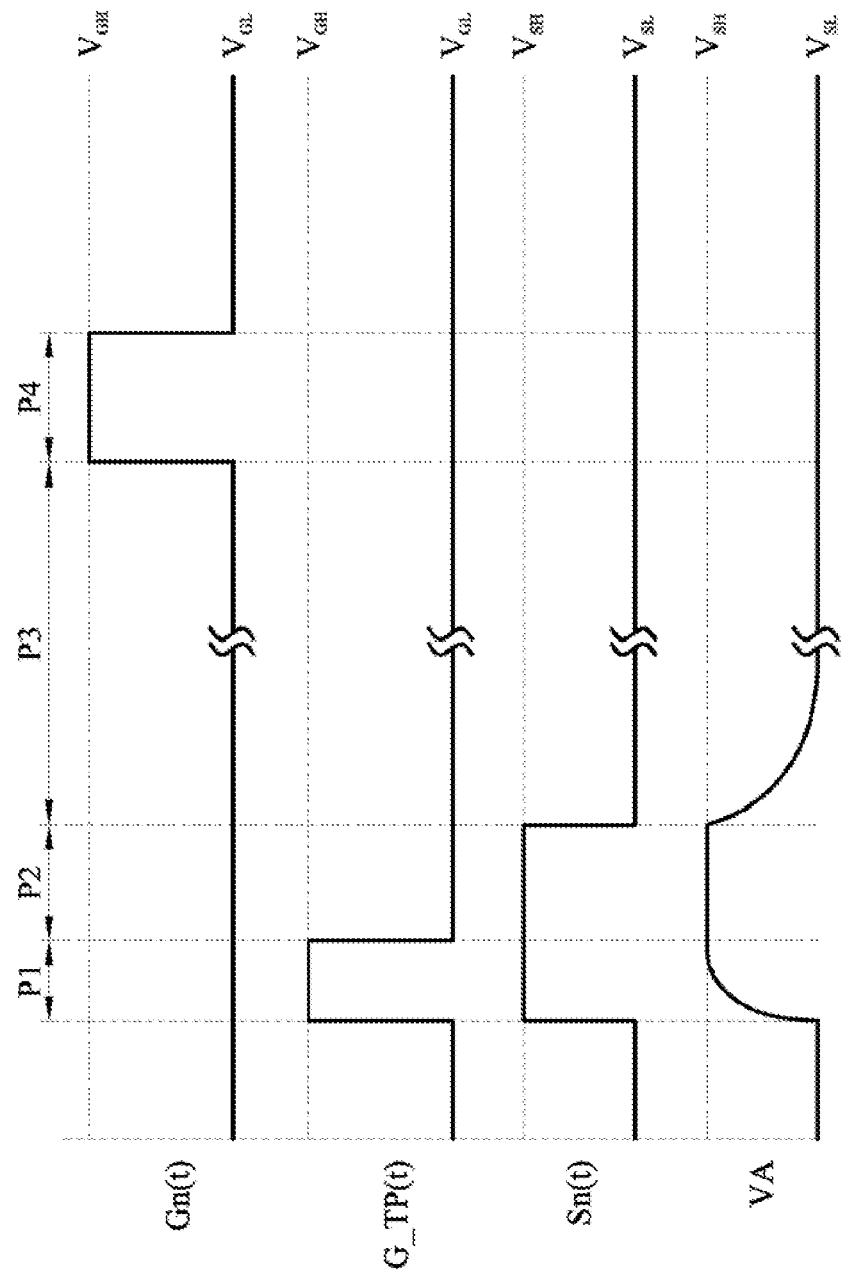
FIG. 6A and FIG. 6B are signal sequence diagrams related to FIG. 5.
Figure 6B:
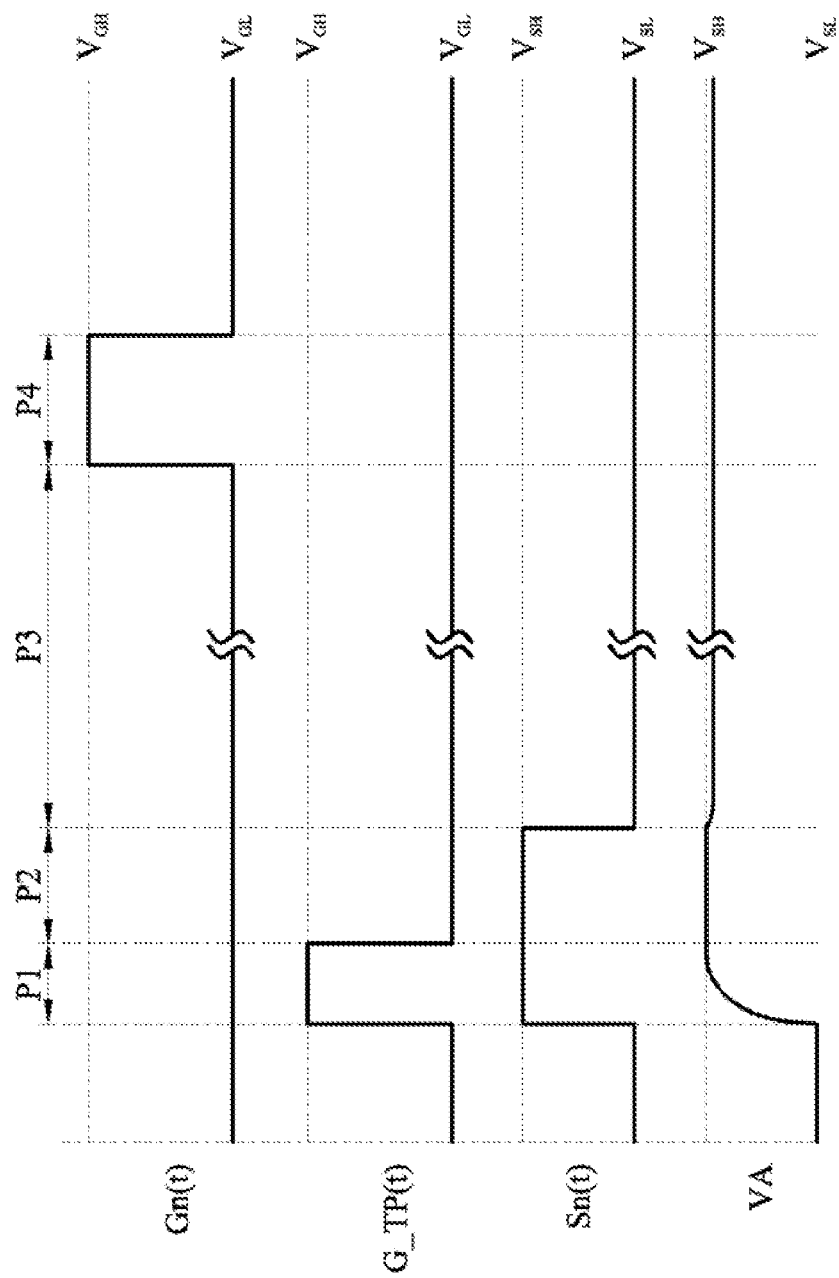

Then, refer to FIG. 6A and FIG. 6B, which are signal sequence diagrams related to FIG. 5. It should be noted that, in this embodiment, a voltage source VSH is at about a high voltage VSH. In FIG. 6A, the color filtering components are exposed to light that includes red light and blue light. In FIG. 6B, the color filtering components are exposed to white light. As shown in FIG. 6A, in a pre-charging time interval P1, the gate voltage G_TP(t) of the first photosensitive transistor switch T1 is about a high voltage VGH, and the first signal end Sn(t) is about at the high voltage VSH; therefore, both of the first photosensitive transistor switch T1 and the second photosensitive transistor switch T2 are turned on. Therefore, the sensing voltage VA will increase to near the high voltage VSH. Then, in a switching time interval P2, the gate voltage G_TP(t) of the first photosensitive transistor switch T1 switches to about the low voltage VGL, to alleviate transistor aging caused when the gate voltage of the first photosensitive transistor switch T1 remains at the high voltage VSH for a long time. In a sensing time interval P3, the first signal end Sn(t) switches to about the low voltage VSL. Because the color filtering component CF1 to the color filtering component CF3 are all exposed to red light and blue light, both of the first photosensitive transistor switch T1 and the second photosensitive transistor switch T2 are turned on under the effect of light. In the sensing time interval P3, because of the connection manner of the third photosensitive transistor switch T3, and because the third photosensitive transistor switch T3 is not triggered by light, the third photosensitive transistor switch T3 is not turned on. Therefore, the sensing voltage VA will decrease to about the voltage of Sn(t), that is, the low voltage VSL. In a sampling time interval P4, a control signal Gn(t) of the sampling circuit switches from the low voltage VGL to the high voltage VGH, so as to perform sampling on the sensing voltage VA, to obtain the low voltage VSL, and therefore, it is determined that the optical sensing circuit is exposed both to red light and blue light.

In the example in FIG. 6B, in the sensing time interval P3, because the color filtering components are exposed to white light, red light penetrates through the color filtering component CF1, blue light penetrates through the color filtering component CF2, and green light penetrates through the color filtering component CF3. Therefore, all the photosensitive transistor switches are turned on under the effect of light. Therefore, a voltage value of the sensing voltage VA will not decrease to the low voltage VSL. In some embodiments, through proper design, a channel width of the third photosensitive transistor switch T3 is greater than that of the second photosensitive transistor switch T2, and the voltage value of the sensing voltage VA will be even close to the voltage (high voltage VSH) of the voltage source VSH.

In terms of action mechanism, using the second photosensitive transistor switch T2 as an example, in the sensing time interval P3, a current I2 that flows through the second photosensitive transistor switch T2 to the first photosensitive transistor switch T1 is about proportional to a product of a luminous flux LB of blue light and the channel width of the second photosensitive transistor switch T2. Using the third photosensitive transistor switch T3 as an example, in the sensing time interval P3, a current I3 that flows through the third photosensitive transistor switch T3 to the first photosensitive transistor switch T1 is about proportional to a product of a luminous flux LG of green light and the channel width of the third photosensitive transistor switch T3. Therefore, through proper design, the sensing voltage VA will decrease to the low voltage VSL in the sensing time interval P3 only when a ratio of the luminous flux of blue light to the luminous flux of green light is greater than a threshold.

Figure 7:
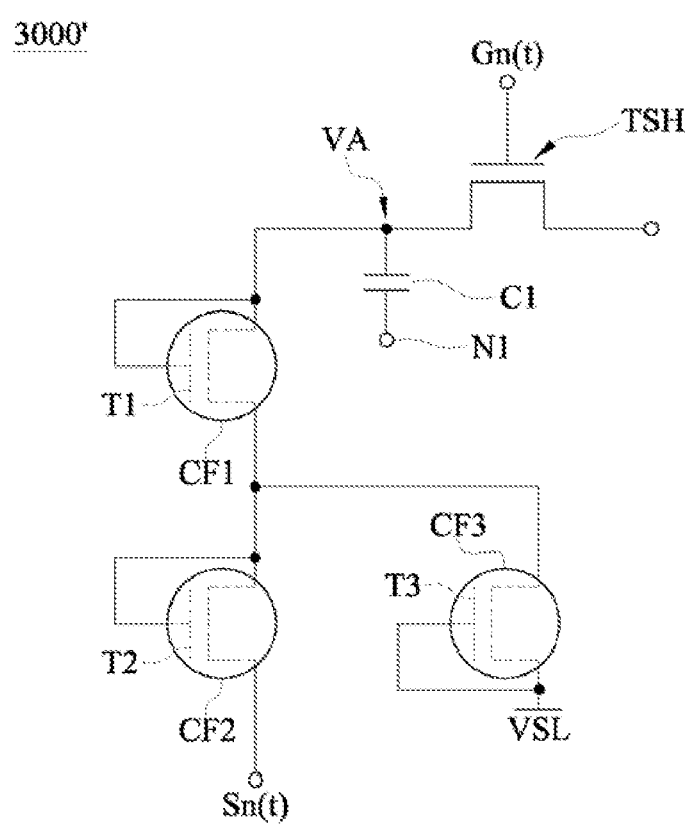
FIG. 7 is a schematic diagram of an optical sensing circuit according to another embodiment of the present disclosure.

In another embodiment, refer to FIG. 7, which is a schematic diagram of an optical sensing circuit according to another embodiment of the present disclosure. As shown in FIG. 7, a difference between the optical sensing circuit 3000' and the optical sensing circuit 3000 in FIG. 5 lies in: a control end of a first photosensitive transistor switch T1 is electrically connected to a first end of the first photosensitive transistor switch T1, a control end of a second photosensitive transistor switch T2 is electrically connected to a first end of the second photosensitive transistor switch T2, a control end of a third photosensitive transistor switch T3 is electrically connected to a second end of the third photosensitive transistor switch T3. Besides, a voltage source is about a VSL, and a voltage of the voltage source is about a low voltage VSL. The foregoing optical sensing circuit 3000 in FIG. 5 may be referred to as a discharging mode optical sensing circuit, while the optical sensing circuit 3000' in FIG. 7 may be referred to as a charging mode optical sensing circuit.

Refer to FIG. 4 again, to understand a sequence of signals in FIG. 7. As shown in FIG. 4, in a pre-charging time interval P1 and a switching time interval P2, a voltage of a first signal end Sn(t) is about a low voltage VSL, and both of the first photosensitive transistor switch T1 and the second photosensitive transistor switch T2 are in a turned-on state because the switches are diode-connected. Therefore, in the foregoing time intervals, the sensing voltage VA decreases to the low voltage VSL. Then, in a sensing time interval P3, the voltage of the first signal end Sn(t) switches to a high voltage VSH. In this case, if the color filtering components of the optical sensing circuit 3000' are exposed to only purple light, the first photosensitive transistor switch T1 is turned on under the effect of red light, the second photosensitive transistor switch T2 is turned on under the effect of blue light, and the third photosensitive transistor switch T3 is not triggered by light and is therefore not turned on. Therefore, the sensing voltage VA will increase to near the high voltage VSH, as shown in a signal sequence diagram of VA (corresponding light) in the figure.

Conversely, if the voltage of the first signal end Sn(t) switches to about the high voltage VSH in the sensing time interval P3, if the color filtering components of the optical sensing circuit 3000' are exposed to white light, the first photosensitive transistor switch T1 is turned on under the effect of red light, the second photosensitive transistor switch T2 is turned on under the effect of blue light, and the third photosensitive transistor switch T3 is turned on under the effect of green light. Therefore, the sensing voltage VA will not increase to near the high voltage VSH, but instead remains close to the low voltage VSL, as shown in a signal sequence diagram of VA (white light) in the figure.

Figure 8:
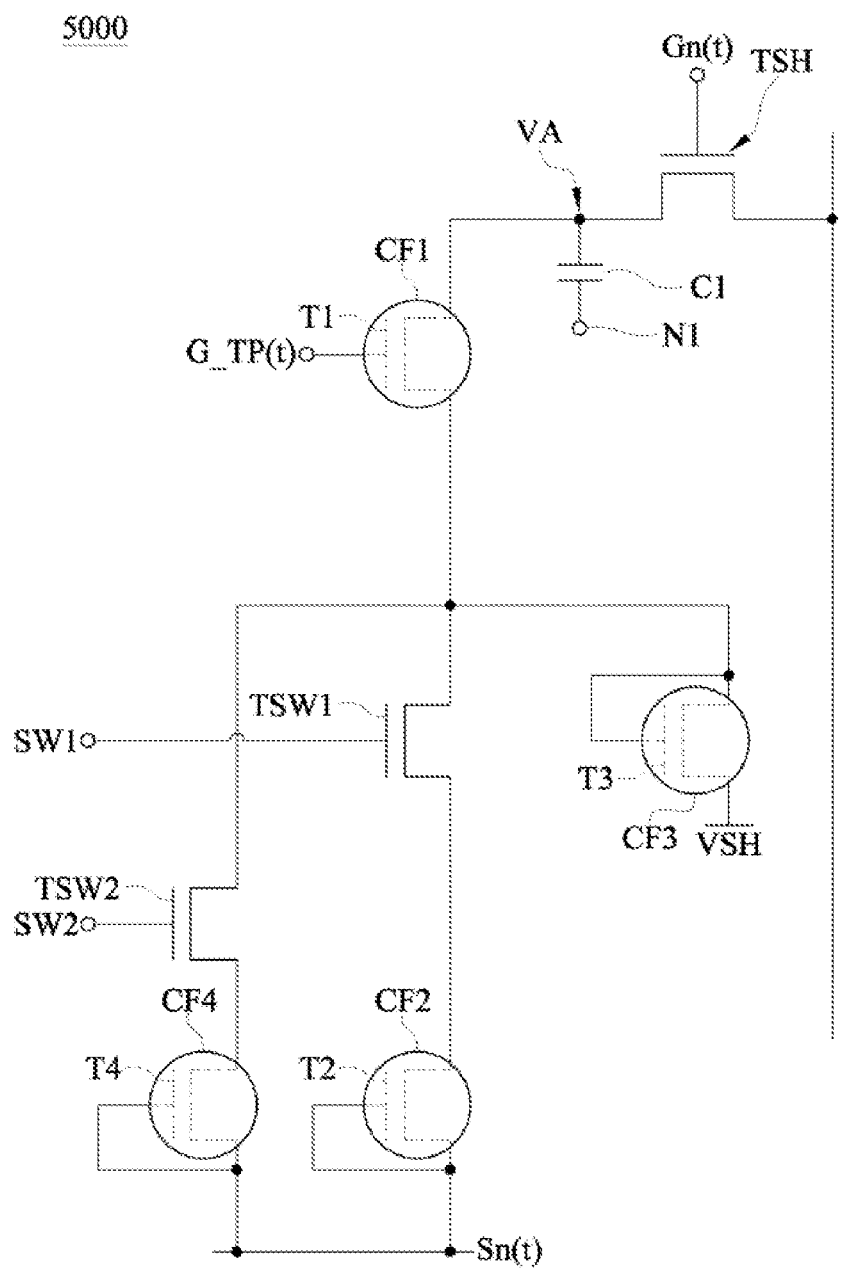
FIG. 8 is a schematic diagram of an optical sensing circuit according to another embodiment of the present disclosure.

In a further embodiment, refer to FIG. 8, which is a schematic diagram of an optical sensing circuit according to another embodiment of the present disclosure. As shown in FIG. 8, compared with the optical sensing circuit 3000 in FIG. 5, an optical sensing circuit 5000 further includes a color filtering component CF4, a fourth photosensitive transistor switch T4, a first switch TSW1, and a second switch TSW2. A first end (an upper end) of a second photosensitive transistor switch T2 is electrically connected to a second end (a lower end) of a first photosensitive transistor switch T1 through the first switch TSW1, that is, a control end of the first switch TSW1 is electrically connected to a selection signal SW1, a second end (a lower end) of the first switch TSW1 is electrically connected to the first end (the upper end) of the second photosensitive transistor switch T2, and a first end (an upper end) of the first switch TSW1 is electrically connected to the second end of the first photosensitive transistor switch T1. A first end (an upper end) of the fourth photosensitive transistor switch T4 is electrically connected to the second end of the first photosensitive transistor switch T1 through the second switch TSW2, that is, a control end of the second switch TSW2 is electrically connected to a selection signal SW2, a second end (a lower end) of the second switch TSW2 is electrically connected to the first end (upper end) of the fourth photosensitive transistor switch T4, and a first end (an upper end) of the second switch TSW2 is electrically connected to the second end of the first photosensitive transistor switch T1. Besides, a color filtering component CF1 and the color filtering component CF4 filter out light except first colored light, a color filtering component CF2 filters out light except second colored light, a color filtering component CF3 filters out light except third colored light, the fourth photosensitive transistor switch T4 is arranged opposite to the color filtering component CF4, and the first switch TSW1 and the second switch TSW2 form a selection circuit.

For example, when the selection signals SW1 and SW2 determine that the first switch TSW1 is turned on and the second switch TSW2 is not turned on, whether the fourth photosensitive transistor switch T4 is triggered by light or not, actuation of the fourth photosensitive transistor switch T4 does not affect a sensing voltage VA. In this case, actuation of the optical sensing circuit is actually the same as that of the optical sensing circuit 3000 shown in FIG. 5. When the second switch TSW2 is turned on and the first switch TSW1 is not turned on, whether the second photosensitive transistor switch T2 is triggered by light or not, actuation of the second photosensitive transistor switch T2 does not affect the sensing voltage VA. In this case, the actuation of the optical sensing circuit and a change in the sensing voltage VA are actually determined by whether the first photosensitive transistor switch T1, the third photosensitive transistor switch T3, and the fourth photosensitive transistor switch T4 are turned on. In an embodiment in which the first colored light is about red light, the second colored light is about blue light, and the third colored light is about green light, the optical sensing circuit 5000 selectively senses red light or purple light according to the selection signals SW1 and SW2.

In the embodiment shown in FIG. 8, the selection circuit formed by the first switch TSW1 and the second switch TSW2 selectively electrically connects the second photosensitive transistor switch T2 or the fourth photosensitive transistor switch T4 to the first photosensitive transistor switch T1. However, in another embodiment, the second photosensitive transistor switch T2 is electrically connected to a first signal end Sn(t) through the first switch TSW1, and the fourth photosensitive transistor switch T4 is electrically connected to the first signal end Sn(t) through the second switch TSW2. In other words, the selection circuit selectively electrically connects the first signal end Sn(t) to the second photosensitive transistor switch T2 or the fourth photosensitive transistor switch T4.

Figure 9:
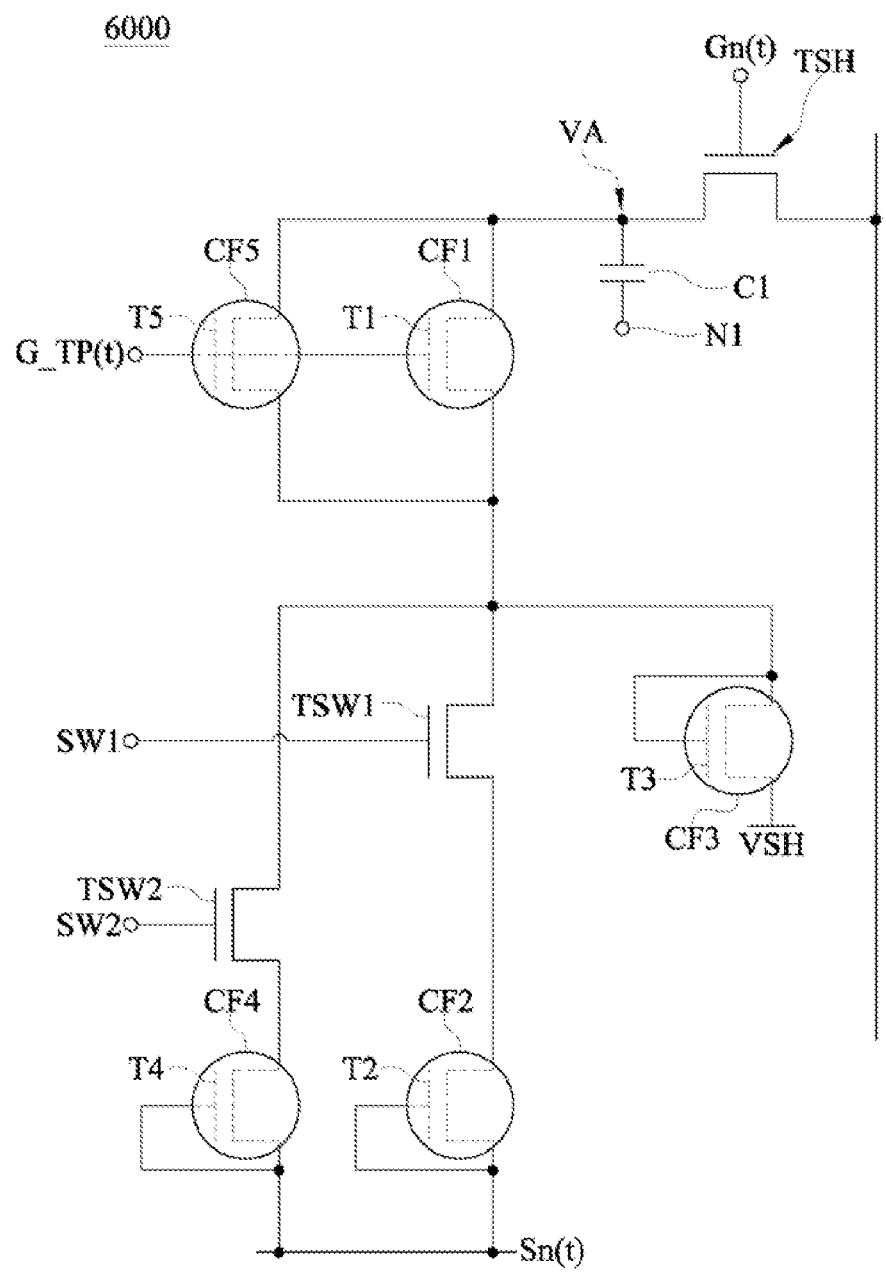
FIG. 9 is a schematic diagram of an optical sensing circuit according to still another embodiment of the present disclosure.

In another embodiment, refer to FIG. 9, which is a schematic diagram of an optical sensing circuit according to still another embodiment of the present disclosure. As shown in FIG. 9, compared with the optical sensing circuit 5000 in FIG. 8, an optical sensing circuit 6000 further has a fifth photosensitive transistor switch T5 and a color filtering component CF5. A first end (an upper end) of the fifth photosensitive transistor switch T5 is electrically connected to a first end of a first photosensitive transistor switch T1, a second end (a lower end) of the fifth photosensitive transistor switch T5 is electrically connected to a second end of the first photosensitive transistor switch T1, and the fifth photosensitive transistor switch T5 is arranged opposite to the color filtering component CF5. A color filtering component CF1 and a color filtering component CF4 filter out light except first colored light, a color filtering component CF2 and the color filtering component CF5 filter out light except second colored light, and a color filtering component CF3 filters out light except third colored light. Therefore, the optical sensing circuit shown in FIG. 9 can sense pure blue light, pure red light, or purple light (light including red light and blue light) under the control of a selection signal SW1 and a selection signal SW2.

In an embodiment, both of the optical sensing circuit shown in FIG. 1 and the optical sensing circuit shown in FIG. 8 or FIG. 9 are configured in a same pixel of a display device, and the first color filtering component of the optical sensing circuit shown in FIG. 1 is configured as a green color filter, and the second color filtering component is configured as a red color filter, so that the optical sensing circuit senses green light. The optical sensing circuit shown in FIG. 8 or FIG. 9 is set to sense red light and purple light.

Figure 10:
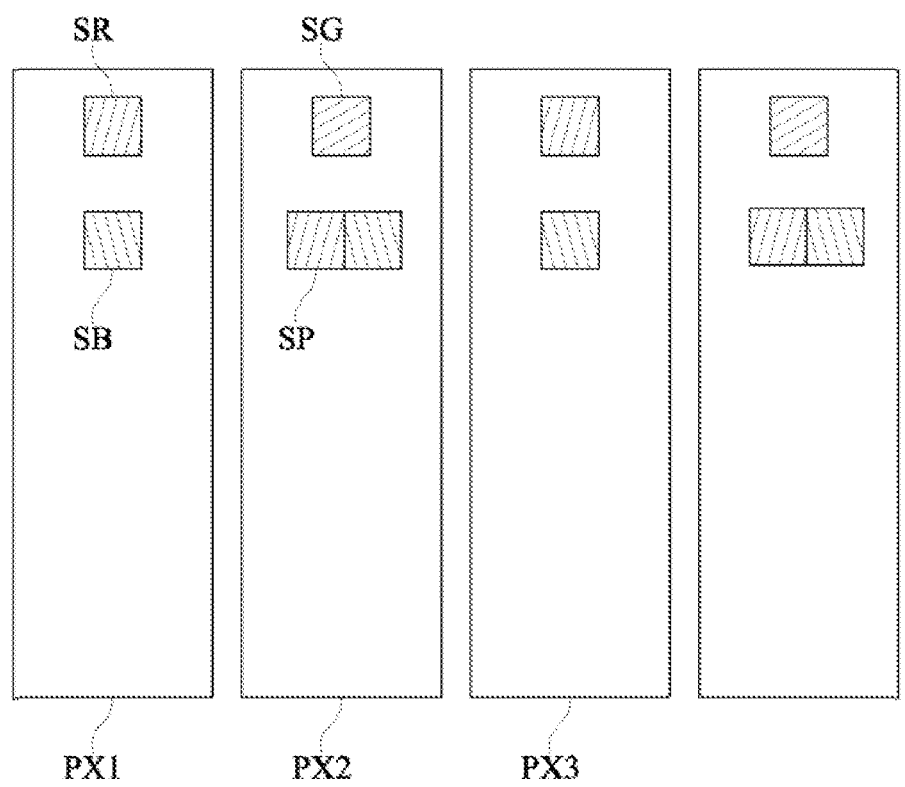
FIG. 10 is a schematic diagram of an optical sensing circuit and a pixel configuration according to an embodiment of the present disclosure.

Specifically, refer to FIG. 10, which is a schematic diagram of an optical sensing circuit and a pixel configuration according to an embodiment of the present disclosure. As shown in FIG. 10, in an embodiment of the present disclosure, a display panel includes a substrate (not shown), and has several pixel units (not marked). Each pixel unit includes at least three sub-pixels, for example, first, second, and third sub-pixels PX1 to PX3. A red light sensing circuit SR and a blue light sensing circuit SB are configured in the first sub-pixel PX1, and a green light sensing circuit SG and a purple light sensing circuit SP (red+blue) are configured in the second sub-pixel PX2 in the display panel. The first sub-pixel PX1 is adjacent to the second sub-pixel PX2.

Figure 11:
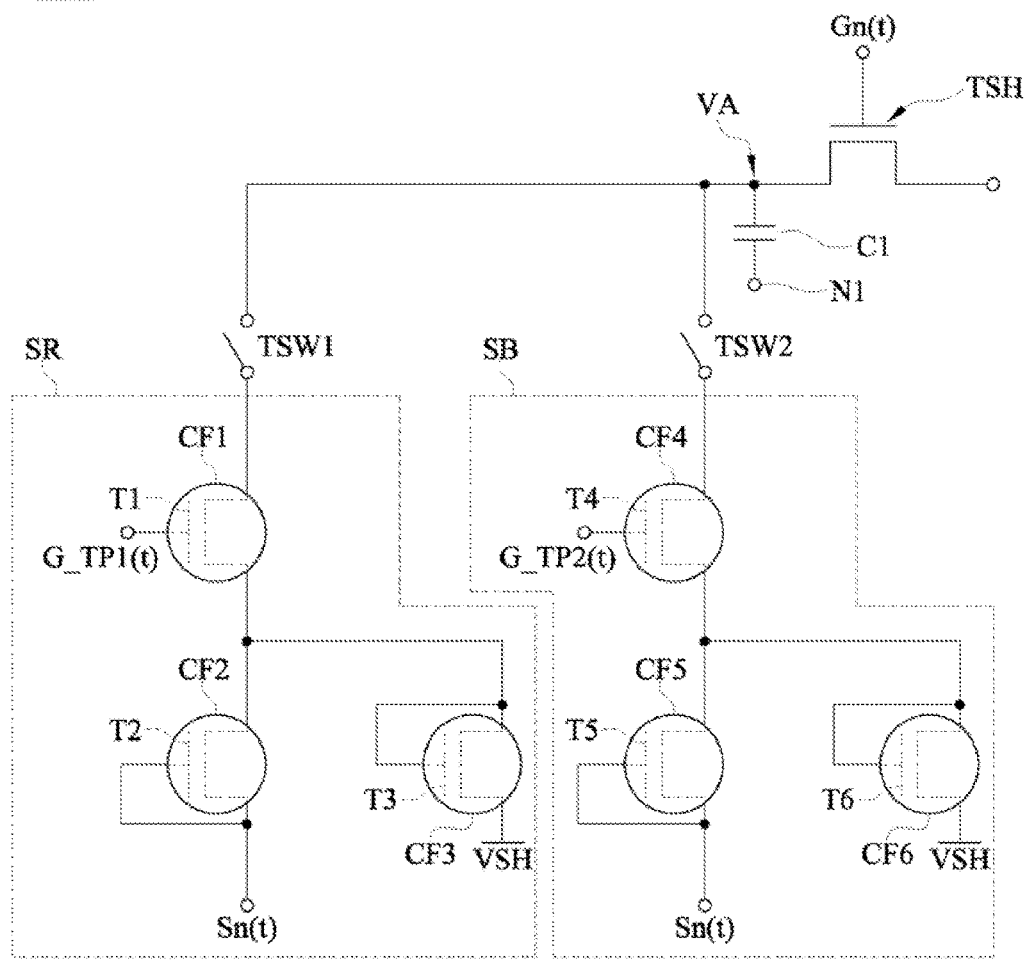
FIG. 11 is a schematic diagram of a time-division optical sensing circuit according to an embodiment of the present disclosure.

Refer to FIG. 11, which is a schematic diagram of a time-division optical sensing circuit according to an embodiment of the present disclosure. As shown in FIG. 11, an optical sensing circuit 7000 has color filtering components CF1 to CF6, a first switch TSW1, a second switch TSW2, a capacitor C1, a sampling circuit TSH, a first photosensitive transistor switch T1, a second photosensitive transistor switch T2, a third photosensitive transistor switch T3, a fourth photosensitive transistor switch T4, a fifth photosensitive transistor switch T5, and a sixth photosensitive transistor switch T6. When the optical sensing circuit 7000 is configured in the first sub-pixel PX1, the color filtering components CF1 and CF2 are set to block light except first colored light. The color filtering components CF4 and CF5 block light except second colored light. The color filtering components CF3 and CF6 block light except third colored light. The first colored light, the second colored light, and the third colored light are different from each other. When the optical sensing circuit 7000 is configured in the first sub-pixel PX1, the first colored light is about, for example, red light, the second colored light is about, for example, blue light, and the third colored light is about, for example, green light. That is, in the embodiment in which the optical sensing circuit 7000 is configured in the first sub-pixel PX1, the color filtering components CF1 to CF3 and the photosensitive transistor switches T1 to T3 are used as an optical sensing circuit corresponding to red light, that is, corresponding to the red light sensing circuit SR in FIG. 10, while the color filtering components CF4 to CF6 and the photosensitive transistor switches T4 to T6 are used as an optical sensing circuit corresponding to blue light, that is, corresponding to the blue light sensing circuit SB in FIG. 10. In an embodiment, the first color filtering components are separate entities, while in another embodiment, the first color filtering components CF1 and CF2 are actually parts of a red color filter, and similarly, the second color filtering components CF4 and CF5 are parts of a blue color filter, and the third color filtering component CF3 and CF6 are parts of a green color filter.

If the optical sensing circuit 7000 is configured in the second sub-pixel PX2 in FIG. 10, the color filtering components CF1, CF2 and CF6 are configured to block light except third colored light. The color filtering component CF5 blocks light except second colored light. The color filtering components CF3 and CF4 block light except first colored light. The first colored light, the second colored light, and the third colored light are different from each other. The first colored light is about, for example, red light, the second colored light is about, for example, blue light, and the third colored light is about, for example, green light. That is, when the optical sensing circuit 7000 is configured in the second sub-pixel PX2, the color filtering components CF1 to CF3 and the photosensitive transistor switches T1 to T3 are used as an optical sensing circuit corresponding to green light, that is, corresponding to the green light sensing circuit SG in FIG. 10, while the color filtering components CF4 to CF6 and the photosensitive transistor switches T4 to T6 are used as an optical sensing circuit corresponding to purple light including red light and blue light, that is, corresponding to the purple light sensing circuit SP in FIG. 10.

In other embodiments, one of the optical sensing circuits in the forgoing embodiments may be used in at least one of the three sub-pixels or even all the three sub-pixels. Alternatively, for at least two of the three sub-pixels, an optical sensing circuit in the first sub-pixel, may be one of the optical sensing circuits in the foregoing embodiments, and the optical sensing circuit in the second or third sub-pixel may be other types of optical sensing circuits in the foregoing embodiments except the optical sensing circuit used in the first sub-pixel. Alternatively, optical sensing circuits in at least three sub-pixels may be three different types of optical sensing circuits in the foregoing embodiments. It should be noted that the sub-pixels of the display panel have displaying and optical sensing capabilities. In addition, at least three sub-pixels may selectively cover three types of color filters, and colors of the color filters covered by the sub-pixels may be substantially the same as or different from those of color filtering components of optical sensing circuits in the sub-pixels.

Figure 12:
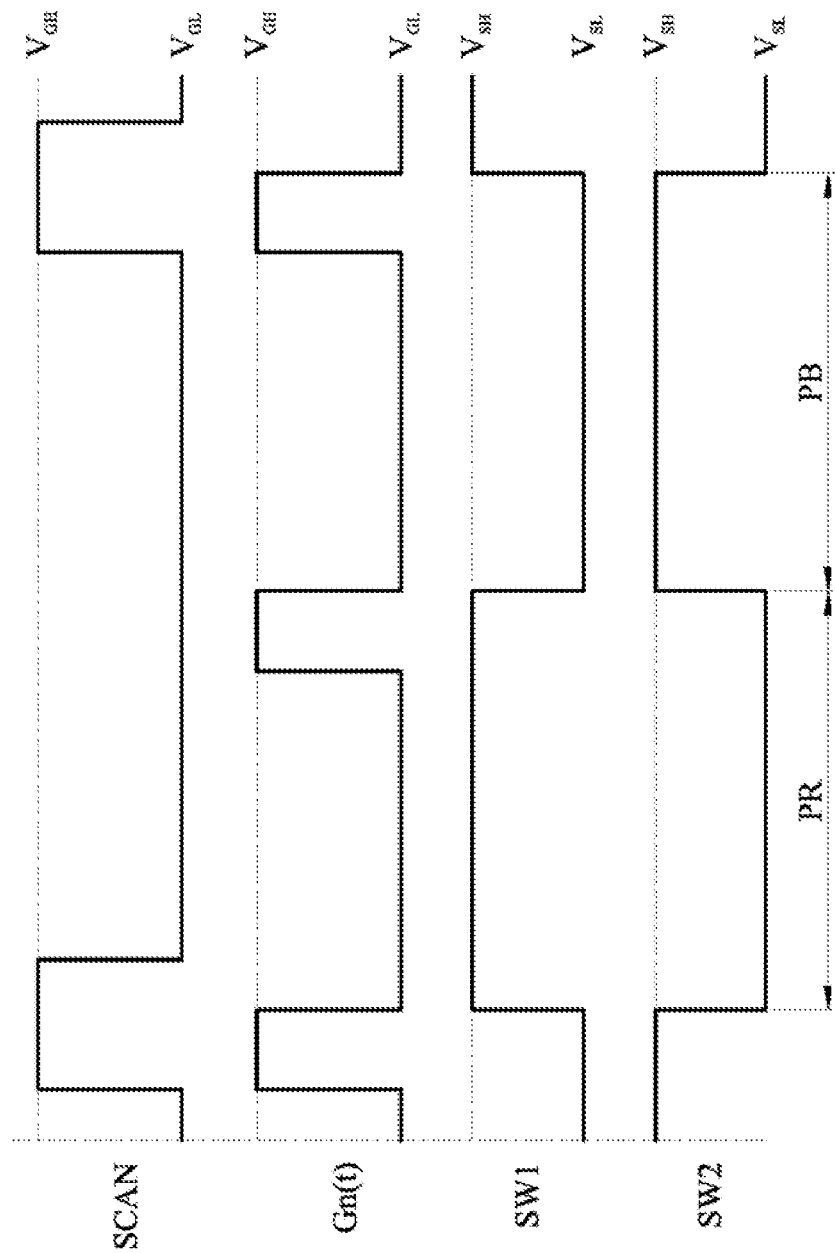
FIG. 12 is a signal sequence diagram corresponding to FIG. 11.

Refer to FIG. 12, which is a signal sequence diagram corresponding to FIG. 11. As shown in FIG. 12, a selection signal SW1 controlling a first switch TSW1 is the opposite of a falling edge of control signal Gn(t), and a selection signal SW2 controlling a second switch TSW2 is the opposite of the selection signal SW1. A frequency of a scan indication signal SCAN is the half of a frequency of the control signal Gn(t). In an embodiment in which the optical sensing circuit 7000 is configured in the first sub-pixel PX1, each scan section of the optical sensing circuit 7000 includes a first scan section PR (red light) and a second scan section PB (blue light). In the first scan section PR, the selection signal SW1 causes the first switch TSW1 to be turned on, and the selection signal SW2 causes the second switch TSW2 to be turned off. Therefore, the optical sensing circuit 7000 is used to sense red light. In the second scan section PB, the selection signal SW1 causes the first switch TSW1 to be turned off, and the selection signal SW2 causes the second switch TSW2 to be turned on. Therefore, the optical sensing circuit 7000 is used to sense red light. In the sections, for actuation of the signals and the components, reference may be made to FIG. 2A and FIG. 2B, which are not described repeatedly herein.

Through the configurations shown in FIG. 10 to FIG. 12, four types of light (red light, blue light, green light, and purple light) can be sensed in a range of two sub-pixels. Therefore, a minimum pitch of optical sensing of the implemented optical sensing display device is low, so as to improve sensing precision of the display device. Besides, through the circuit shown in FIG. 11 plus the sequence diagram shown in FIG. 12, two optical sensing circuits located in a same sub-pixel actually share one capacitor and one sampling circuit. In one pixel, an area occupied by the optical sensing circuits is reduced, so as to increase an aperture ratio.

Besides, in another embodiment, through the optical sensing circuit in FIG. 8, a circuit sensing monochromatic light and mixed light can be implemented in one circuit, for example, the red and purple light sensing circuit used as an example in FIG. 8. A blue and cyan light sensing circuit (cyan light is a mixture of blue light and green light) can be implemented in the same manner, and a green and yellow light sensing circuit (yellow light is a mixture of green light and red light) can also be implemented. Therefore, when the foregoing optical sensing circuits are respectively configured in the first sub-pixel PX1, the second sub-pixel PX2, and the third sub-pixel PX3, six types of light can be sensed in a range of three sub-pixels.

In conclusion, according to the optical sensing circuit in the foregoing embodiments of the present disclosure, through the configuration of circuit connections, functions of excluding ambient light and sensing mixed light can be implemented.

Although the foregoing embodiments of the present disclosure are disclosed above, they are not intended to limit the present invention. All variations and modifications made without departing the spirit and scope of the present invention fall within the patent protection scope of the present invention. For the protection scope of the present invention, refer to the claims.

What is claimed is:

1. An optical sensing circuit, comprising:
   a first sensing component, having a first end and a second end, wherein a first current path between the first end of the first sensing component and the second end of the first sensing component is selectively established according to whether the first sensing component receives first colored light;
- a capacitor, separately electrically connected to the first end of the first sensing component and a first voltage end;
- a sampling circuit, electrically connected to the first end of the first sensing component;
- a first ambient light sensing circuit, comprising:
  - a second sensing component, having a first end and a second end, wherein the first end of the second sensing component is electrically connected to the second end of the first sensing component, and a second current path between the first end of the second sensing component and the second end of the second sensing component is selectively established according to whether the second sensing component receives the first colored light; and
  - a third sensing component, having a first end and a second end, wherein the first end of the third sensing component is electrically connected to the second end of the first sensing component, the second end of the third sensing component is electrically connected to a voltage source, and a third current path between the first end of the third sensing component and the second end of the third sensing component is selectively established according to whether the third sensing component receives second colored light; and
- a second ambient light sensing circuit, separately electrically connected to the second end of the second sensing component, a first signal end, and the voltage source, and configured to electrically connect, in a sensing time interval, the first signal end to the second end of the second sensing component when the first colored light is sensed, and electrically connect the voltage source to the second end of the second sensing component when the second colored light is sensed, wherein in the sensing time interval, a voltage of the first signal end is different from a voltage of the voltage source.

2. The optical sensing circuit according to claim 1, wherein in the sensing time interval, the voltage of the first signal end is lower than the voltage of the voltage source.

3. The optical sensing circuit according to claim 2, wherein the second sensing component is a transistor, and has a control end electrically connected to the first signal end.

4. The optical sensing circuit according to claim 2, wherein the third sensing component is a transistor, and has a control end electrically connected to the first end of the third sensing component.

5. The optical sensing circuit according to claim 1, wherein in the sensing time interval, the voltage of the first signal end is higher than the voltage of the voltage source.

6. The optical sensing circuit according to claim 5, wherein the second sensing component is a transistor, and has a control end electrically connected to the first end of the second sensing component.

7. The optical sensing circuit according to claim 5, wherein the third sensing component is a transistor, and has a control end electrically connected to the voltage source.

8. The optical sensing circuit according to claim 1, further comprising:
- a fourth sensing component, having a first end and a second end, wherein the first end of the fourth sensing component is electrically connected to the second end of the first sensing component, the second end of the fourth sensing component is electrically connected to the voltage source, and a fourth current path between the first end of the fourth sensing component and the second end of the fourth sensing component is selectively established according to whether the fourth sensing component receives third colored light.

9. The sensing circuit according to claim 1, wherein a width of a transistor in the third sensing component is greater than a width of a transistor in the second sensing component.

10. An optical sensing circuit, comprising:
- a first sensing component, having a first end and a second end, wherein a first current path between the first end of the first sensing component and the second end of the first sensing component is selectively established according to whether the first sensing component receives first colored light;
- a capacitor, separately electrically connected to the first end of the first sensing component and a first voltage end;
- a sampling circuit, electrically connected to the first end of the first sensing component;
- a second sensing component, having a first end and a second end, wherein the first end of the second sensing component is electrically connected to the second end of the first sensing component, the second end of the second sensing component is electrically connected to a first signal end, and a second current path between the first end of the second sensing component and the second end of the second sensing component is selectively established according to whether the second sensing component receives second colored light; and
- a third sensing component, having a first end and a second end, wherein the first end of the third sensing component is electrically connected to the second end of the first sensing component, the second end of the third sensing component is electrically connected to a voltage source, and a third current path between the first end of the third sensing component and the second end of the third sensing component is selectively established according to whether the third sensing component receives third colored light.

11. The optical sensing circuit according to claim 10, wherein the second sensing component is a transistor and has a control end electrically connected to the first signal end, and the third sensing component is a transistor and has a control end electrically connected to the first end of the third sensing component.

12. The optical sensing circuit according to claim 10, wherein the second sensing component is a transistor, and has a control end electrically connected to the first end of the second sensing component, and the third sensing component is a transistor, and has a control end electrically connected to the voltage source.

13. The optical sensing circuit according to claim 12, wherein the first sensing component is a transistor, and has a control end electrically connected to the first end of the first sensing component.

14. The optical sensing circuit according to claim 10, further comprising:
- a fourth sensing component having a first end and a second end, wherein the first end of the fourth sensing component is electrically connected to the second end of the first sensing component, the second end of the fourth sensing component is electrically connected to the first signal end, and a fourth current path between the first end of the fourth sensing component and the second end of the fourth sensing component is selectively established according to whether the fourth sensing component receives the first colored light; and a selection circuit, electrically connected to the second sensing component and the fourth sensing component, so that actuation of one of the second sensing component and the fourth sensing component does not affect the first sensing component.

15. The optical sensing circuit according to claim 14, wherein the selection circuit comprises:

a first switch, having a first end and a second end, wherein the first end of the first switch is electrically connected to the second end of the first sensing component, the second end of the first switch is electrically connected to the first end of the second sensing component, and when the first switch is turned on under control of a first selection signal, the second sensing component is electrically connected to the first sensing component through the first switch; and a second switch, having a first end and a second end, wherein the first end of the second switch is electrically connected to the second end of the first sensing component, the second end of the second switch is electrically connected to the first end of the fourth sensing component, and when the second switch is turned on under control of a second selection signal, the fourth sensing component is electrically connected to the first sensing component through the first switch.

16. The optical sensing circuit according to claim 14, wherein the selection circuit comprises:

a first switch, having a first end and a second end, wherein the first end of the first switch is electrically connected to the second end of the second sensing component, the second end of the first switch is electrically connected to the first signal end, and when the first switch is turned on under control of a first selection signal, the second sensing component is electrically connected to the first signal end through the first switch; and a second switch, having a first end and a second end, wherein the first end of the second switch is electrically connected to the second end of the fourth sensing component, the second end of the second switch is electrically connected to the first signal end, and when the second switch is turned on under control of a second selection signal, the fourth sensing component is electrically connected to the first signal end through the first switch.

17. The optical sensing circuit according to claim 16, further comprising a fifth sensing component, having a first end and a second end, wherein the first end of the fifth sensing component is electrically connected to the first end of the first sensing component, the second end of the fifth sensing component is electrically connected to the second end of the first sensing component, and a fifth current path between the first end of the fifth sensing component and the second end of the fifth sensing component is selectively established according to whether the fifth sensing component receives the second colored light.

18. The optical sensing circuit according to claim 16, wherein both of the optical sensing circuit and a sensing circuit configured to sense the third colored light are located in a first sub-pixel of a display device.

* * * * *